United States Patent [19]

Adamson

[11] Patent Number: 5,150,774
[45] Date of Patent: Sep. 29, 1992

[54] WHEELS INCORPORATING BRAKE DISCS

[75] Inventor: John Adamson, Wirral, England

[73] Assignee: Sab Wabco Holdings, B.V., Heerhugowaard, Netherlands

[21] Appl. No.: 665,791

[22] Filed: Mar. 8, 1991

[30] Foreign Application Priority Data

Mar. 10, 1990 [GB] United Kingdom ............... 9005421

[51] Int. Cl.$^5$ ............................................. F16D 65/12
[52] U.S. Cl. .......................... 188/218 XL; 192/107 R
[58] Field of Search .................... 188/73.2, 218 XL; 192/70.13, 107 R

[56] References Cited

U.S. PATENT DOCUMENTS

| 3,430,741 | 3/1969 | Meredith | 188/218 XL |
| 3,526,307 | 9/1970 | Falzone | 188/218 XL X |
| 4,645,041 | 2/1987 | Bass | 188/218 X |

FOREIGN PATENT DOCUMENTS

| 0159639 | 10/1985 | European Pat. Off. |
| 0216534 | 4/1987 | European Pat. Off. |
| 1530244 | 1/1970 | Fed. Rep. of Germany. |
| 3818713 | 12/1989 | Fed. Rep. of Germany ...... 188/218 XL |
| 1526204 | 9/1978 | United Kingdom. |
| 1585789 | 3/1981 | United Kingdom ........ 188/218 XL |
| 2060096 | 4/1981 | United Kingdom. |
| 1599663 | 10/1981 | United Kingdom. |
| 2128695 | 5/1984 | United Kingdom. |
| 2132290 | 7/1984 | United Kingdom ........ 188/218 XL |

Primary Examiner—George E. A. Halvosa
Attorney, Agent, or Firm—Oblon, Spivak, McClelland, Maier & Neustadt

[57] ABSTRACT

A wheel has a central hub and an outer rim interconnected by a web, with a pair of annular braking discs being mounted one on each side of the web and each composed of at least two curved segments, each secured to the web by a number of wide clearance bolts, at least two close clearance bolts and at least two further bolts. The wide clearance bolts are each a clearance fit both in an aperture in a segment and in a bore in the web; the close clearance bolts are a close fit both in an aperture in a segment and a bore in the web; and the further bolts are a close fit in an aperture in a segment and a wide clearance fit in a bore in the web.

4 Claims, 2 Drawing Sheets

WHEELS INCORPORATING BRAKE DISCS

DESCRIPTION

The present invention relates to a wheel incorporating a braking disc.

In particular the present invention relates to a wheel, primarily for use on railway vehicles, comprising a central hub and an outer rim interconnected by a web, a braking disc being mounted on each side of the wheel. Each braking disc is comprised of at least two arcuate segments, each of which segments is secured to the web.

Certain known wheels of the above-described construction have segmented braking discs which are merely bolted to the web of the wheel, the bolts each passing first through an aperture in one braking disc and then through an aperture in the web, the bolts engaging in complementarily threaded bores in the other braking disc or passing through an aperture in the other braking disc and being engaged with a complementarily threaded nut. The braking discs thus sandwich the web of the wheel, and expansion of the braking discs due to the heat generated under braking is usually allowed for by the bolts being able to move in the bores in the web and the apertures in the braking discs. In one construction two close clearance bolts are provided for each segment of the braking disc, these bolts being a close clearance in both the bores in the web and the apertures in the braking disc segments on the opposite side of the web. These close clearance bolts are symmetrically arranged with respect to the braking disc segment, relatively close together with enough clearance in the bores and apertures to permit inter bolt disc/wheel temperature difference expansion to occur. However, these close clearance bolts positively resist rotational forces in the disc segments and maintain positioned integrity relative to balance. A number of wide clearance bolts, i.e. wide clearance in the bores in the web and in the apertures in the braking segments, are provided to further secure the braking disc segments to the wheel web. The heads and nuts of these wide clearance bolts hold the disc segments by virtue of friction between the interengaging surfaces, expansion of the segments being catered for by the frictional grip of the bolt heads and nuts being overcome, the bolts moving in the apertures/bores. However, the wide clearance bolts suffer bending fatigue failure resulting from differential disc movement both radially and tangentially, between the discs on opposite sides of the web. This appears as there is some small clearance between the close fitted bolts and the bores in the web.

The aim of the present invention is to provide a wheel incorporating a braking disc wherein the braking disc is secured in position by bolts such that bending stress is not applied to any wide clearance bolts as the discs can only move together.

According to the present invention there is provided a wheel comprising a central hub and an outer rim interconnected by a web, a pair of annular braking discs being mounted one on each side of the web, each annular braking disc being comprised of at least two curved segments, each segment being secured to the web by a number of wide clearance bolts, at least two close clearance bolts and at least two further bolts, said wide clearance bolts being each a clearance fit in both an aperture in a segment and in a bore in the web, said close clearance bolts being a close fit in both an aperture in the segment and a bore in the web, and said further bolts being a close fit in an aperture in the segment and a wide clearance fit in a bore in the web.

By virtue of said further bolts the corresponding segments on opposite sides of the wheel web are positively maintained in the same relative position so that as the segments move under thermal expansion the wide clearance bolts are not subjected to any bending stress.

In a preferred embodiment of the present invention each annular braking disc comprises two like curved segments. Each curved segment is secured by a number of wide clearance bolts to a corresponding segment on the other side of the web, which wide clearance bolts pass through spaced apart apertures in the radially outer edge region of the segment. A further wide clearance bolt passes through an aperture in the centre of the radially inner edge of the segment, and a close clearance bolt passes through an aperture located on each side of the further wide clearance bolt. Additionally and in accordance with the present invention two further bolts are provided, one at each end region of the curved segment, in the radially inner edge region of the segment. Each of these further bolts is a close fit in apertures in the corresponding segments on opposite sides of the web and a wide clearance fit in a bore in the web. Thus the relative positions of the corresponding curved segments on opposite sides of the web is always maintained.

Preferably these further bolts each comprise one or two fitted bushes which pass through the segment apertures and web bore, the bushes being bolted together with radially extending axial end flanges engaging the segments. Alternatively, one bush with a radial flange at one axial end passes through both apertures and the bore, and together with a washer and bolt passing therethrough, clamps the corresponding segments together, the bush or bushes being a close fit in the apertures in the segments and a wide clearance fit in the bore in the web.

The present invention will now be further described, by way of example, with reference to the accompanying drawings, in which.

Figure 1:
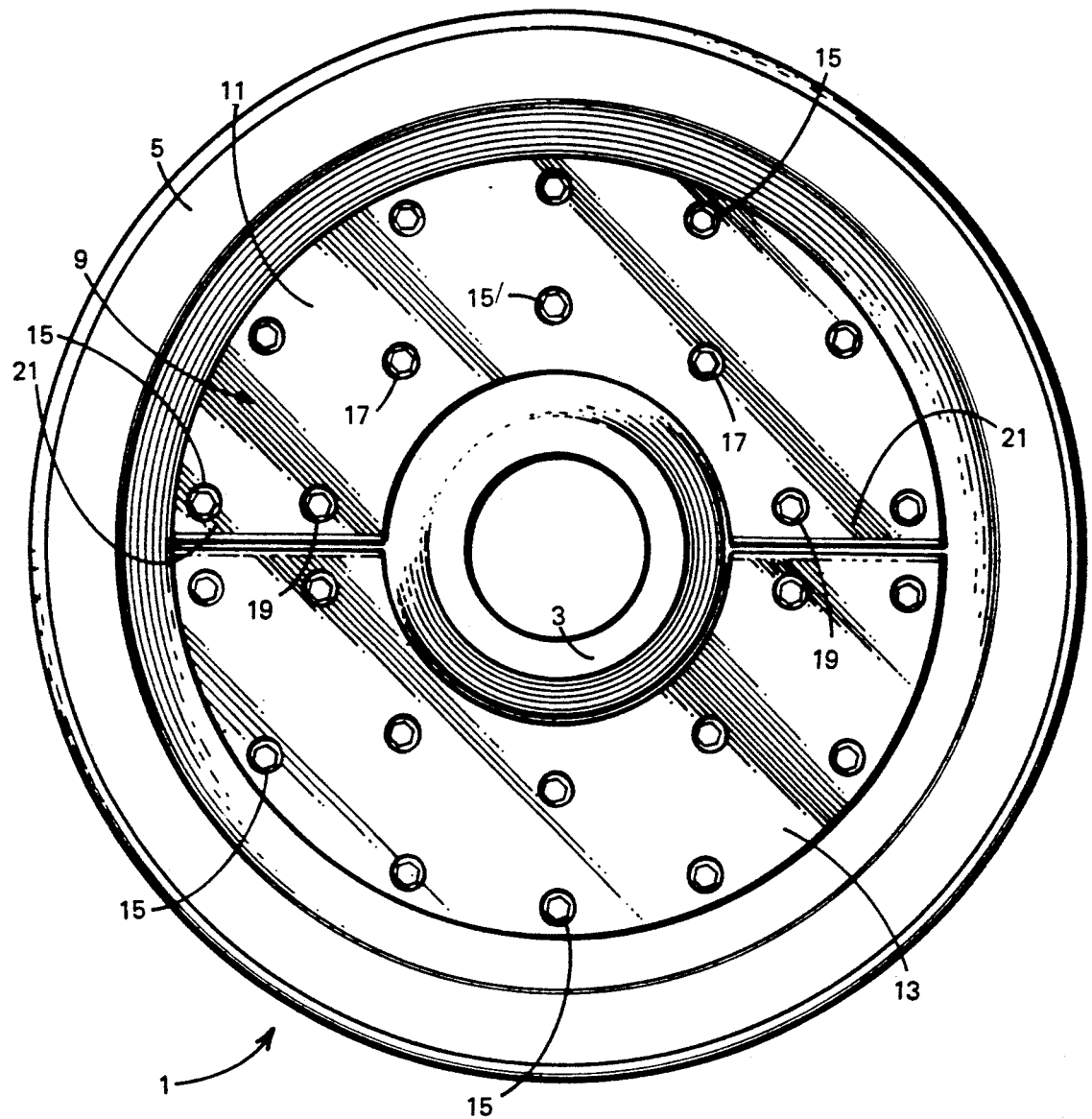
FIG. 1 is a front view of a preferred embodiment of a wheel constructed according to the present invention.
Figure 2:
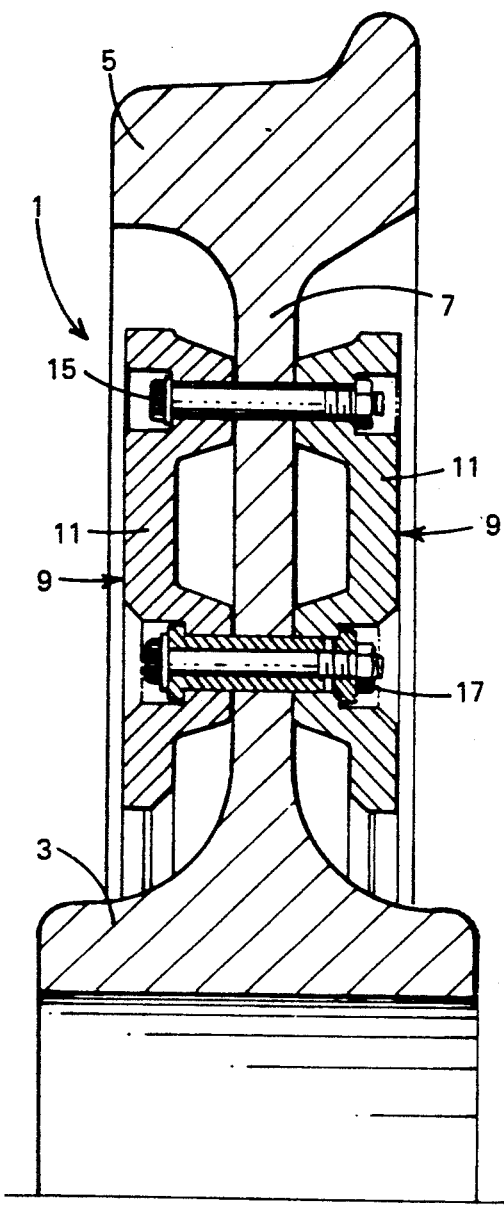
FIG. 2 is a cross-sectional view of part of the wheel of FIG. 1.

The preferred embodiment of the present invention illustrated in the accompanying drawings comprises a wheel which has a central hub 3 which is connected to an outer rim 5 by a radially extending planar web 7. An annular braking disc 9 formed by two curved like segments 11,13 is secured to each side of the web 7. Each segment 11,13 is secured to the web 7 by a number of bolts 15,17 and 19, which pass through bores in the web and are attached to a corresponding segment on the other side of the web.

Bolts 15 are wide clearance bolts by virtue of the fact that they each pass with substantial clearance through apertures in the corresponding segments and with substantial clearance through a bore in the web 7. These wide clearance bolts 15 are located at spaced apart positions around the radially outer edge region of each segment 11,13. Also, such a wide clearance bolt 15' is located centrally in the inner edge region of each segment 11,13.

Bolts 17 are close clearance bolts by virtue of the fact that they are each a close fit in apertures in corresponding segments and in a bore in the web 7. There are two close clearance bolts 17 located relatively close to each other on either side of bolt 15' in the inner edge region of the segments. Whilst these close clearance bolts 17 are a close fit in the respective apertures/bores, there is a small clearance to allow the material between the two close fitted bolts to expand freely whilst sufficiently well locating the segments to maintain wheelset balance.

Further bolts 19 are each a close fit in the respective apertures in the corresponding segments on opposite sides of the web 7, but are a substantial clearance fit in the respective bores in the wheel web 7. Two such further bolts 19 are provided, one at each end region 21 of each segment 11,13, in the radially inner edge region. These further bolts 19 thus maintain the relative positions of the corresponding segments 11,13 so that no bending stresses are imposed on the wide clearance bolts 15 as a result of differential disc movement.

Figure 3:
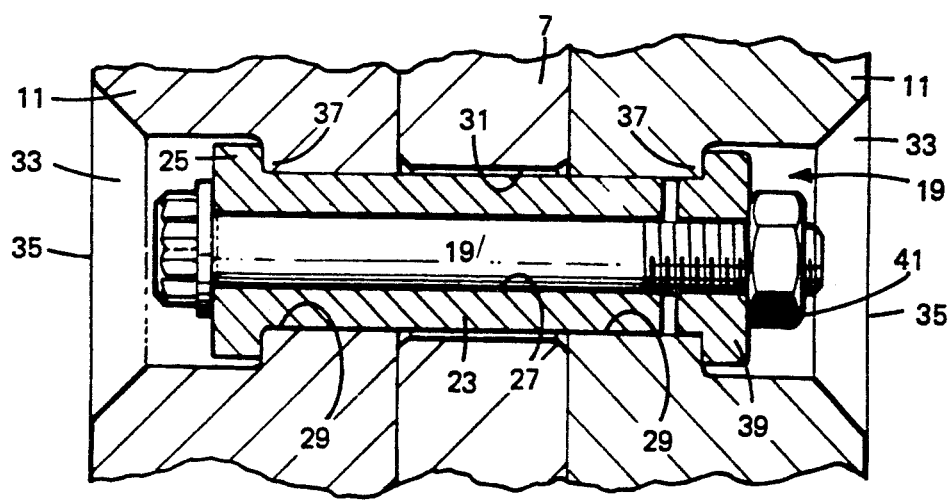
FIG. 3 is an axial cross-sectional view of part of the wheel of FIG. 1 showing a preferred form of one of the further bolts.

A preferred form for said further bolts 19 is illustrated in FIG. 3 of the accompanying drawings, each bolt 19 comprising a cylindrical dowel 23 with a radially outwardly extending flange 25 at one axial end thereof and a bore 27 extending axially therethrough. As seen in FIG. 3 the dowel 23 is a close fit in the apertures 29 in corresponding disc segments 11, and a substantial clearance fit in the bore 31 in the wheel web 7. The apertures 29, as all of the apertures in the braking discs, are countersunk as at 33 to thus present a smooth braking surface 35 when a bolt 19' is passed through the bore 27. The flange 25 engages a shoulder 37 in the aperture 29 in one segment 11 and does not extend as far as the outer end of the aperture 29 in the corresponding segment 11. A washer 39 is located on the bolt 19' and tightened by a nut 41 against the shoulder 37 in the aligned aperture 29 in the corresponding segment 11.

With the above arrangement of further bolts 19, the disc segments 11,13 on opposite sides of the wheel web 7, move together and thus eliminate the application of excessive bending loads on the other clearance bolts 15.

The present invention thus provides a bolt arrangement which enhances the life expectancy of a wheel with fitted braking discs.

I claim:

1. A wheel comprising a central hub and an outer rim interconnected by a web having two oppositely facing sides, a pair of annular braking discs being mounted one on one side of said web and the other on the other side of said web, each annular braking disc being comprised of two curved segments, each segment being secured to said web and to an aligned segment on the opposite side of said web by a number of wide clearance bolts, two close clearance bolts and two further bolts, said wide clearance bolts passing through spaced apart apertures in the radially outer edge regions of said segments and being each a clearance fit both in aligned apertures in the respective segments and in a bore in the web, said close clearance bolts being a close fit both in aligned aperture located in the respective segments on each side of a radial center line midway between the ends of each said segment and in a bore in the web, and said further bolts being a close fit in aligned apertures located in the segments one at each end region of the respective curved segments in the radially inner edge region of the segments, and a wide clearance fit in a bore in the web.

2. A wheel according to claim 1, wherein each of said further bolts includes a bolt and two axially spaced parts coaxially aligned with each other, at least one of said parts being a cylindrical bush surrounding said bolt and which passes with a close fit through an aperture in a segment on one side of the web and into said web bore with clearance, said parts being bolted together by said bolt, each of said parts having a radially extending flange engaging respective segments.

3. A wheel according to claim 2, wherein said cylindrical bush extends through said web bore and with a close fit partially through a coaxially aligned aperture in the segment on the other side of said web, said other axially spaced part being a washer which engages in said coaxially aligned aperture in said segment on the other side of said web.

4. A wheel as claimed in claim 1, in which a further wide clearance bolt passes through an aperture in the center of the radially inner edge region of each of the aligned segments, this further wide clearance bolt being a clearance fit in both the apertures in the aligned segments and in a bore in the web.

* * * * *